United States Patent [19]

Young

[11] Patent Number: 5,150,860
[45] Date of Patent: Sep. 29, 1992

[54] AIR VEHICLE LAUNCHING DEVICE
[75] Inventor: Manley A. Young, Issaquah, Wash.
[73] Assignee: The Boeing Company, Seattle, Wash.
[21] Appl. No.: 690,063
[22] Filed: Apr. 23, 1991
[51] Int. Cl.$^5$ .............................................. B64F 1/10
[52] U.S. Cl. ...................................... 244/63; 244/50
[58] Field of Search ................. 244/50, 63, 115, 116, 244/110 E, 100 R, 102 R, 104 R; 414/546, 732, 729, 728, 428, 429; 180/904, 14.1

[56] References Cited

U.S. PATENT DOCUMENTS

| | | | |
|---|---|---|---|
| 1,736,226 | 11/1929 | Spencer | 244/102 R |
| 1,803,320 | 5/1931 | Christianson | |
| 1,818,417 | 8/1931 | Milburn | 244/104 R |
| 1,830,901 | 11/1931 | Hicks | 244/104 R |
| 2,005,980 | 6/1935 | Minshall | 244/102 R |
| 2,204,546 | 6/1940 | Fleet et al. | 244/63 |
| 2,331,837 | 10/1943 | King | 244/63 |
| 2,604,279 | 7/1952 | Gerin | 244/63 |
| 2,783,005 | 2/1957 | Kane | 244/63 |
| 2,798,729 | 7/1957 | Paul | 280/35 |
| 3,239,080 | 3/1966 | Corompt | 414/546 |
| 3,963,196 | 6/1976 | Walker | 244/50 |
| 4,036,384 | 7/1977 | Johnson | 214/334 |
| 4,462,560 | 7/1984 | Earl | 244/63 |
| 4,653,706 | 3/1987 | Ragiab | 244/110 E |
| 4,658,924 | 4/1987 | Dobbie | 180/14.1 |

FOREIGN PATENT DOCUMENTS

| | | | |
|---|---|---|---|
| 807173 | 1/1937 | France | 244/63 |
| 999871 | 2/1952 | France | |
| 757255 | 9/1956 | United Kingdom | 244/63 |
| 792685 | 4/1958 | United Kingdom | 244/50 |
| 887999 | 1/1962 | United Kingdom | 414/546 |
| 21267037 | 5/1986 | United Kingdom | 414/546 |
| 2211155 | 6/1989 | United Kingdom | 244/63 |

Primary Examiner—Galen Barefoot
Attorney, Agent, or Firm—John C. Hammar

[57] ABSTRACT

A launching device carrier (14) has fuselage supports (24, 44) and ground engaging wheels (18). A pair of outrigger assemblies (84, 122) are spaced laterally from the carrier (14) on opposite sides of the carrier (14). Each assembly includes a ground-engaging wheel truck (122) and a wing support (84) spaced laterally outwardly from the truck (122). The assemblies (84, 122) are connected to the carrier (14) by connector structures that permit relative vertical movement between the assemblies (84, 122) and the carrier (14). The carrier wheels (18) react centerline vertical loads to the ground. The outrigger wheels (126) independently react wing weight vertical loads to the ground. The connector structure preferably includes a main boom (64,64') hingedly connected to the carrier (14), and an outer boom (82, 132) pivotally attached to the outer end of the main boom (64, 64'). The outer end boom (82, 132) pivots to move the wing support (84) between an upper support position and a lower release position. The connector structures can be folded into a relatively compact transport position. A loader (150) may be detachably secured to the carrier (14) for loading an aircraft (2) onto the device (12, 130). The loader (150) includes first and second stage actuators (160, 194) for moving the aircraft (2) into position on the carrier (14).

26 Claims, 10 Drawing Sheets

AIR VEHICLE LAUNCHING DEVICE

GOVERNMENT RIGHTS

The Government has rights in this invention.

TECHNICAL FIELD

This invention relates to devices for supporting air vehicles during taxi and take-off and, more particularly, to such a device having a center carrier for supporting a fuselage, and a pair of opposite outrigger assemblies that include wing supports and independently react wing weight vertical loads to a take-off surface.

BACKGROUND INFORMATION

There are many situations in which it is desirable to maximize the range of an air vehicle. This can generally be accomplished by maximizing the amount of fuel that can be carried by the vehicle and minimizing the weight of the vehicle itself. One type of air vehicle that can carry a large amount of fuel relative to its size and weight is a high aspect ratio aircraft in which the wings are loaded with fuel. "High aspect ratio" refers to aircraft which have long wing spans from wing tip to wing tip relative to the mean wing chord. In other words, the wings are relatively long in the lateral direction and narrow between their leading and trailing edges.

During flight, high aspect ratio wings are aerodynamically supported. However, when the wings are fully loaded with fuel for take-off, the wing fuel load tends to cause the long slender wings to bend. Therefore, the wings need to be supported to control wing bending and enable take-off of the aircraft.

One way of providing the required support for the wing fuel load is to equip the aircraft with permanent take-off and landing gear mounted on the wings. This approach adds a good deal of weight to the aircraft and, therefore, reduces its range. The effect on the aircraft's range can be mitigated by detachably mounting the gear on the aircraft wings to allow it to be jettisoned after take-off. A system with jettisonable gear helps maintain the range but has the disadvantages of being relatively complex, expensive, and cumbersome to use.

During the last several decades, there have been a number of proposals for assisting the launch of aircraft by means of ground based vehicles. Some of the vehicles that have been proposed have been designed to allow either the complete elimination of landing gear or significant reductions in the size and complexity of the gear, which would be required to function only during landing when the aircraft is much lighter than at take-off. The present invention addresses the inadequacies of known types of aircraft launch devices. The invention is primarily concerned with the problem of the unsuitability of known devices for launching high aspect ratio aircraft with wing fuel loads.

DISCLOSURE OF THE INVENTION

A subject of the invention is a device for supporting, for taxi and take-off, an air vehicle having a fuselage and a pair of wings extending laterally outwardly from the fuselage. According to a basic aspect of the invention, the device comprises a center carrier and a pair of outrigger assemblies. The carrier has at least one support for the fuselage, and a portion that engages a take-off surface and reacts centerline vertical loads to the surface. The assemblies are spaced laterally from the carrier on opposite sides of the carrier. Each assembly includes a wing support, and a portion that engages the take-off surface to independently react wing weight vertical loads to the surface A pair of connector structures connect the assemblies, respectively, to the carrier. The structures allow vertical movement of the assemblies relative to the carrier.

The connector structures may take various forms. Preferably, each structure includes a main boom and an outer boom. The main boom has a laterally inner end connected to the carrier, and a laterally outer end. The outer boom is pivotally attached to the outer end of the main boom to pivot about a horizontal axis between a support position and a release position. In the preferred embodiments of the invention, the surface-engaging portion of the outrigger assembly extends downwardly from the main boom, and the wing support is carried by the outer boom. This arrangement facilitates the inclusion of another preferred feature of the invention, the spacing of the wing support laterally outwardly from the surface-engaging portion of the assembly. The structure preferably also includes a brace extending diagonally from a laterally outer portion of the main boom to the carrier. In the preferred embodiments, both the main boom and the brace are pivotally attached to the carrier to pivot about a common horizontal axis.

In a first preferred embodiment, both the outer boom and the main boom include an external skin aerodynamically shaped to minimize drag. In an alternative embodiment, the outer boom comprises a four bar linkage. Each of the outrigger assemblies preferably includes a shock absorber to protect the wing from instantaneous vertical acceleration loads. The preferred arrangement is an assembly that has a first shock absorber depending downwardly from the main boom and a second shock absorber associated with the wing support. The wing support includes a support surface positioned to engage an undersurface of one of the wings. The second shock absorber is positioned below the support surface.

Another feature of the invention is a connector structure that is pivotable between a use position in which it extends generally laterally from the carrier and a folded position. The structure is releasably securable in the use position. This feature helps minimize the amount of space occupied by the device when it is not in use and also facilitates transport of the device aboard an aircraft. The feature is especially advantageous in connection with a device dimensioned to support a high aspect ratio aircraft which requires widely spaced wing support points.

The device of the invention provides an efficient and cost effective means for supporting a high aspect ratio aircraft during take-off. The device is relatively simple in structure and easy to operate. It reduces wing bending during the take-off procedure to an acceptable minimum. The reduction in wing bending can be readily maximized by positioning the wing supports in optimum locations. The independent reacting of vertical loads by the carrier and the outrigger assemblies efficiently supports the aircraft while allowing relative vertical movement between the assemblies and the carrier. The relative vertical movement, in turn, automatically compensates for runway surface irregularities and factors such as the runway crown, i.e. the slightly higher elevation of the runway at its center than at its sides. The feature of spacing the wing supports laterally outwardly from the surface-engaging portions of the assemblies allows the wing supports to be located at optimum points even when the distance between the optimum points is greater than the width of the runway.

Another subject of the invention is a loader for loading an air vehicle onto a launching device having a top portion with at least one support for the air vehicle fuselage. The loader basically comprises a pair of first stage beams, a pair of second stage arms, and a linking structure. Each of the first stage beams has a forward end and an aft end. The arms correspond to the beams. Each arm has a forward end pivotally connected to the aft end of the corresponding beam, and an aft end attachable to the fuselage. The beams and the arms are positioned to straddle a lower portion of the fuselage. The linking structure is attached to the beams and attachable to the launching device. A first stage actuator engages the linking structure to move the forward ends of the beams vertically, and forwardly and aftly. A second stage actuator pivots the second stage arms relative to the beams. The first and second stage actuators are operable together to precisely position the fuselage relative to the support on the launching device and bring the fuselage into engagement with the support.

The loader of the invention has a number of advantages. It can be manufactured and maintained at relatively low cost. An air vehicle can be loaded onto a launching device quickly and easily using the loader. During the loading procedure, the loader constrains the air vehicle against forces, such as wind gusts, to protect the vehicle from damage. Therefore, the loader is very versatile and may be used in a variety of circumstances without exposing the air vehicle to damage. The loader also readily lends itself to being folded into a compact storage position and, thus, can be stored or transported with the launching device or stored separately so that it is available when needed.

These and other advantages and features of the invention will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

The drawings show two embodiments 12, 130 of the device of the invention that constitute the best modes for carrying out the invention currently known to the applicant. In the drawings, the device 12, 130 is shown being used in connection with a remotely controlled aircraft 2. It is anticipated that the primary use of the device of the invention will be supporting, during taxi and take-off, aircraft of the type shown in the drawings. However, it is intended to be understood that the device of the invention may also be used to advantage in connection with other types of air vehicles, including piloted air vehicles.

The aircraft 2 shown in the drawings has a fuselage 4 and opposite wings 6. The aircraft 2 is a very high aspect ratio aircraft. In other words, its wing span from wing tip to wing tip is very long in relation to the mean wing chord (the distance between the leading and trailing edges of the wings). The long slender wings 6 of the aircraft 2 include fuel tanks along the length of the wings 6. Therefore, when the aircraft 2 is on the ground and the wings 6 are filled with fuel, the wings 6 tend to bend and, thus, require support to enable the aircraft 2 to take off. The device of the invention provides support for the wings 6 as well as the fuselage 4 of the aircraft 2.

Referring to FIGS. 1-9, the first preferred embodiment 12 of the device of the invention includes a center carrier 14 and a pair of outrigger assemblies 84, 122 spaced laterally from the carrier 14 on opposite sides of the carrier 14. The carrier 14 has supports 24, 44 for the aircraft fuselage 4 and reacts centerline vertical loads of the aircraft 2 to a take-off surface. As shown, the carrier 14 has wheels 18 that engage a ground surface and reacts the loads thereto. It is anticipated that devices of the invention will normally react centerline vertical loads in this manner. However, the loads could also be reacted to other types of surfaces and by other types of structures consistently with the invention. For example, the carrier could be provided with pontoons or similar structures to react loads to a body of water.

Each outrigger assembly 84, 122 includes two portions, a wing support 84 and a portion 122 that engages the take-off surface to independently react wing weight vertical loads to the surface. Each assembly 84, 122 is connected to the carrier 14 by a connector structure that allows vertical movement of the assemblies 84, 122 relative to the carrier 14. As shown, each connector structure comprises a main boom 64 and an outer boom 82. The ground-engaging portion 122 of each assembly is carried by and extends downwardly from a laterally outer portion of the main boom 64. The wing support 84 is carried by the laterally outer end of the outer boom 82.

As described above, the two portions 84, 122 of each outrigger assembly are spaced laterally from each other. The two portions could also be positioned at a single point along the corresponding connector structure without departing from the invention. The laterally-spaced configuration has at least two major advantages and is generally preferred. The lateral spacing of the wing support 84 from its corresponding ground-engaging portion 122, in combination with the main boom/outer boom configuration of the connector structure, facilitates the inclusion in the device of means for pivoting the wing support 84 from an upper support position into a lower release position to ensure the support 84 does not interfere with take-off of the aircraft 2. The laterally-spaced arrangement of the portions 84, 122 also permits the ground-engaging portions 122 of the two assemblies to be positioned within the width of a runway while the wing supports 84 are spaced apart from each other a distance greater than the width of the runway. The ability to space the supports 84 in this manner facilitates the positioning of the wing supports 84 at points along the wings 6 optimum for minimizing wing bending.

Figure 1:
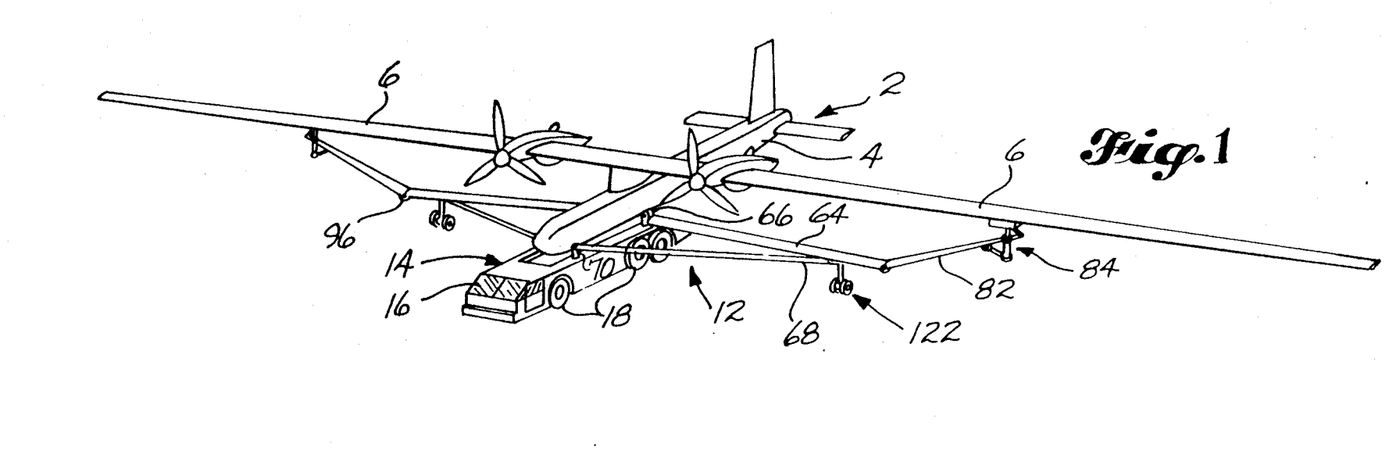
FIG. 1 is a pictorial view of a first preferred embodiment of the device of the invention with an aircraft mounted thereon.
Figures 2, 3:
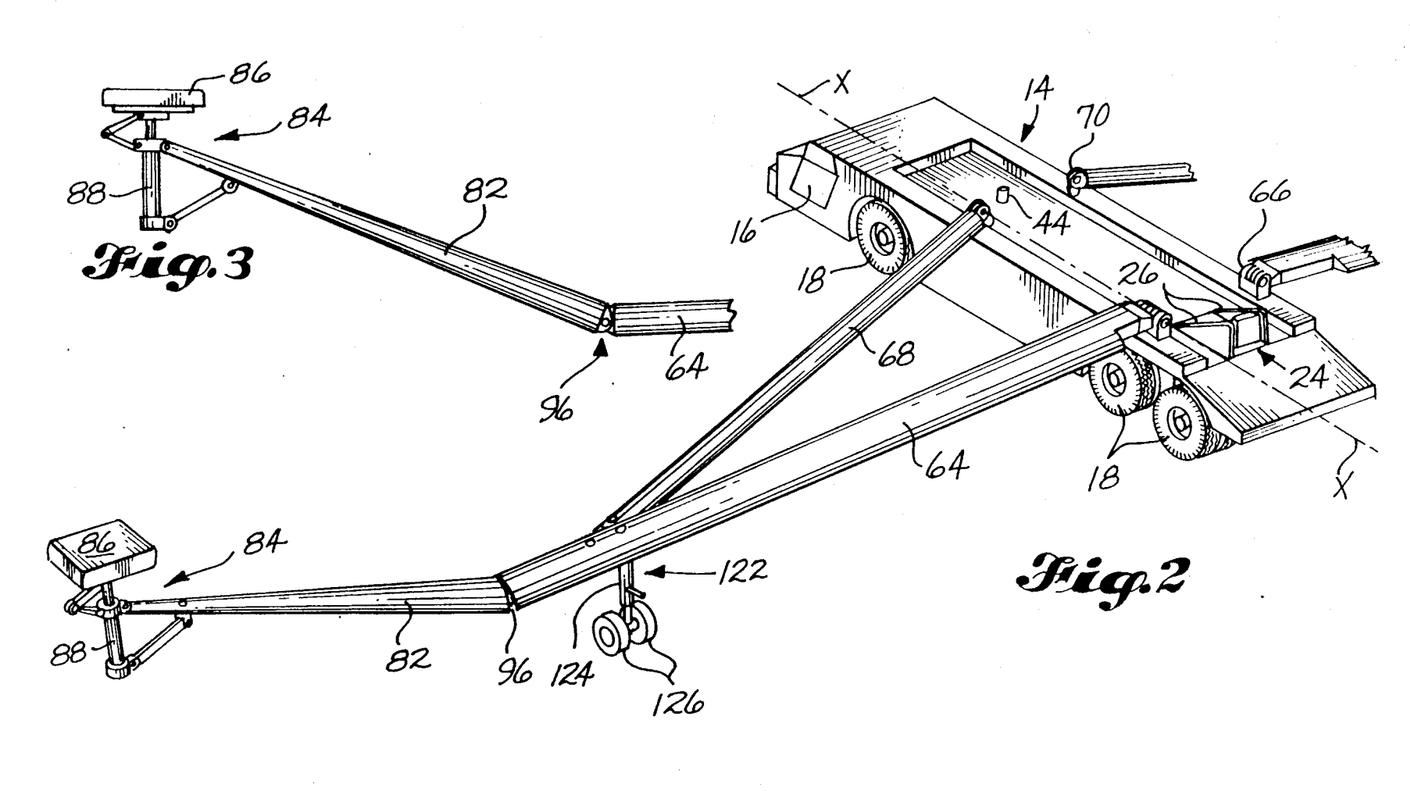
FIG. 2 is an enlarged pictorial view of a portion of the device shown in FIG. 1.
FIG. 3 is an elevational view of a laterally outer portion of the device shown in FIGS. 1 and 2.

The carrier of the invention may be piloted by a driver or remotely controlled. The latter arrangement may be chosen, for example, because of safety considerations. Referring to FIGS. 1 and 2, the illustrated carrier 14 includes a driver cab 6 positioned at the front of the carrier 14. The cab 16 is located low and forward of the front wheels 18 of the carrier 14 to provide the driver with good visibility while minimizing the carrier's frontal area. The carrier 14 is self-propelled and has an engine 20 and a power train 22 (FIG. 11) that drive the rear wheels 18 of the carrier 14.

Figure 6:
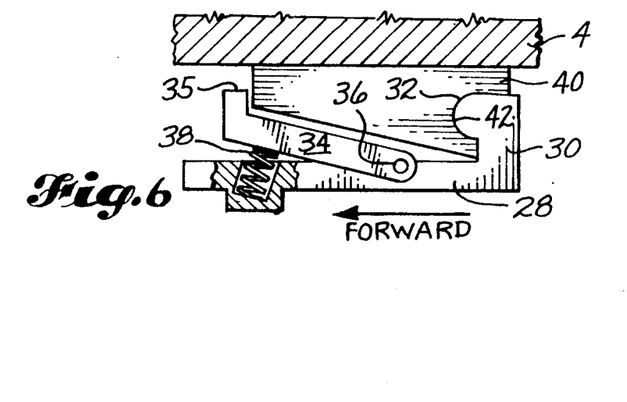
FIG. 6 is an elevational view of the main support pedestal of the device shown in FIGS. 1-3, with parts shown in section.

In accordance with the invention, the carrier 14 has at least one support for the fuselage of an air vehicle. As shown, the carrier 14 has an aft main support pedestal 24 and a front fitting 44, which are located on a longitudinal centerline of the carrier 14 and support the fuselage at points along a line parallel to the centerline of the aircraft. The details of the structure of the support pedestal 24 are shown in FIG. 6. The pedestal 24 is positioned over the rear wheels 18 of the carrier 14 and includes a base 28 with an aft upwardly projecting lug 30. The upper portion of the lug 30 has a forwardly-facing rounded protuberance 32 formed thereon. A latch member 34 is pivotably mounted by a pivot pin 36 to the base 28 forward of the lug 30. The latch 34 extends forwardly and upwardly from its pivot connection 36 and terminates at its forward end in an upwardly projecting leg 35. The latch 34 is biased upwardly by a spring 38.

The support 24 is dimensioned to engage an engagement member 40 carried by the fuselage 4 of the aircraft 2, as shown in FIG. 6. The member 40 has a rounded, rearwardly-facing opening 42 which receives the rounded protuberance 32 on the rear lug 30. The member 40 tapers upwardly and forwardly to parallel the generally L-shaped latch 34. The forward upwardly projecting leg 35 of the latch 34 restrains forward movement of the member 40, and the engagement of the protuberance 32 in the opening 42 restrains upward and rearward movement. The support pedestal 24 is provided with side members 26 (shown in FIGS. 2 and 11) to restrain lateral movement of the member 40. The engagement and restraint of the member 40 in turn supports and restrains movement of the fuselage 4 of the aircraft 2.

Figure 7:
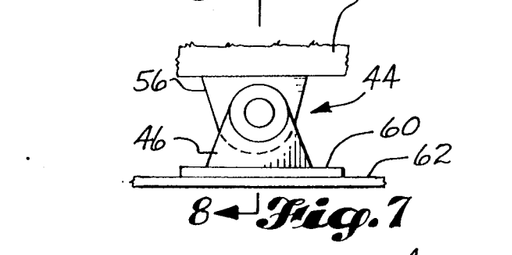
FIG. 7 is an elevational view of the front fitting of the device shown in FIGS. 1-3.
Figure 8:
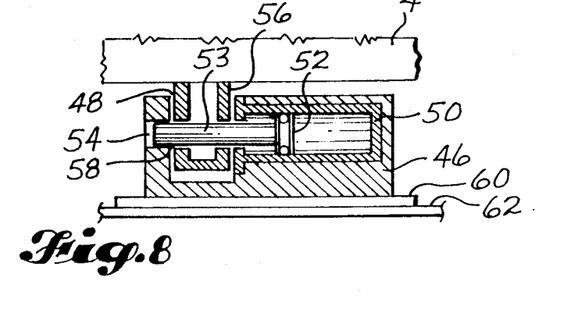
FIG. 8 is a sectional view taken along the line 8—8 in FIG. 7.
Figure 11:
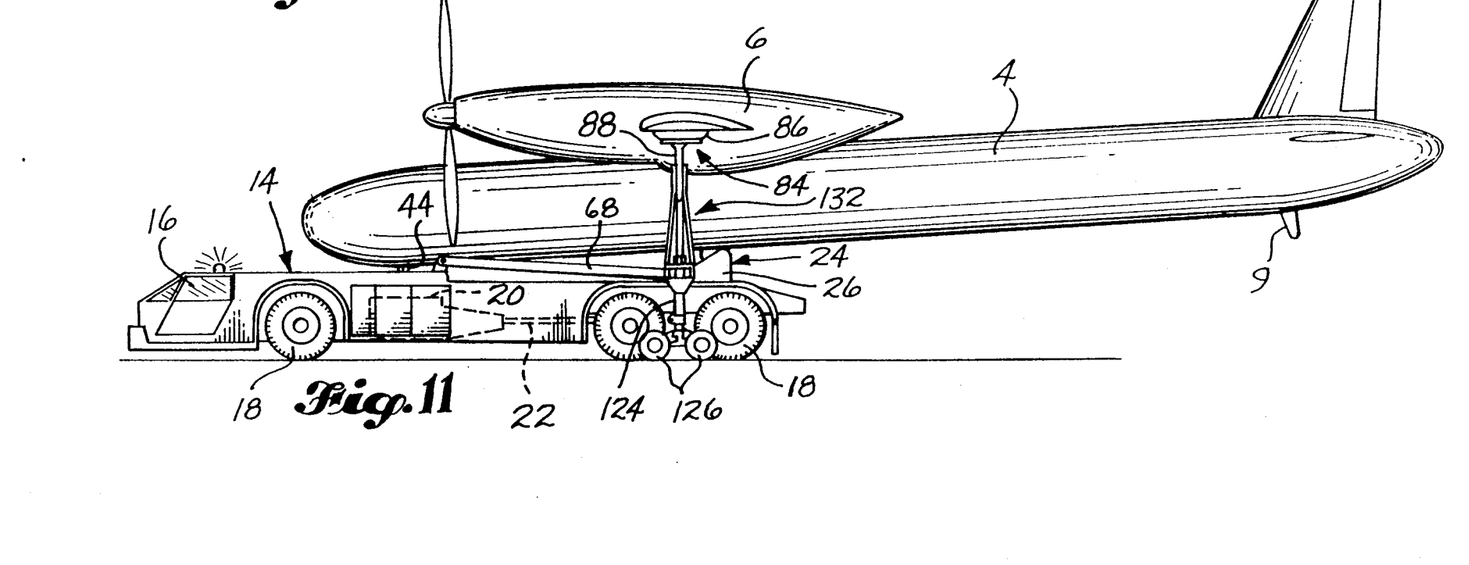
FIG. 11 is a side elevational view of the device and aircraft shown in FIG. 10.

The front fitting 44 is illustrated in FIGS. 7 and 8. It is positioned to engage a nose portion of the aircraft 2, as best seen in FIG. 11. The fitting 44 includes a yoke member 46 secured to the top wall 62 of the carrier 14 by means of a mounting plate 60. The yoke 46 defines an opening 48 which surroundingly receives a projection 56 carried by the aircraft fuselage 4. A cylinder 50, in which a piston 52 reciprocates, is mounted within the yoke 46. The piston 52 is actuated pneumatically or hydraulically in a known manner to extend the piston rod 53 into the opening 48 to secure the aircraft projection 56 therein. The rod 53 extends through an opening 58 in the projection 56 and into a hole 54 in the sidewall of the opening 48 opposite the cylinder 50. This provides a secure releasable connection of the nose portion of the fuselage 4 to the carrier 14.

As mentioned above, the structure that connects each of the outrigger assemblies 84, 122 to the carrier 14 preferably includes a main boom 64 and an outer boom 82. The main boom 64 is pivotally attached to the carrier 14 and extends laterally therefrom. The hinge mount 66 of the laterally inner end of the boom 64 to the carrier 14 is best seen in FIG. 2. The mount 66 includes a clevis mounted on the carrier 14 to which the boom end is pin connected. The pin defines a horizontal hinge axis X which allows the boom 64 to pivot relative to the carrier 14. The clevis has a spindle axis that also allows it to rotate about a vertical axis to permit the boom 64 to be moved into a folded position, described further below. The structure of the mount 66 is similar to that of the connection between the main boom 64 and its diagonal brace 6, illustrated in FIG. 5 and described below.

Figure 5:
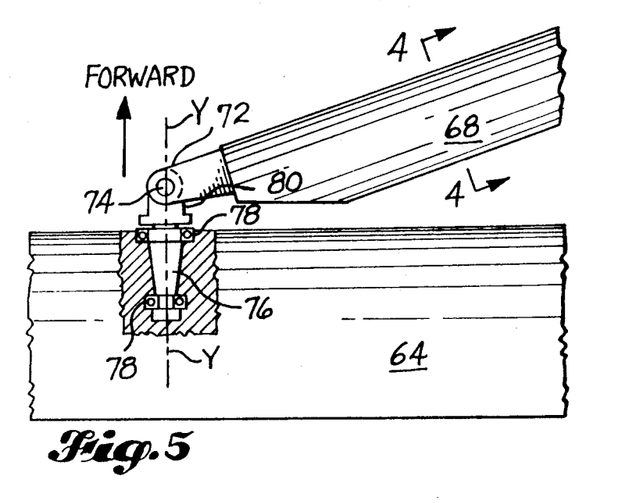
FIG. 5 is a plan view of the connection between the main boom and the brace of the device shown in FIGS. 1-3, with foreground portions cut away.

In the preferred embodiments shown in the drawings, the connector structure also includes a diagonal brace 68. Fore and aft movement of the main boom 64 is restrained by the diagonal brace 68. The brace 68 has a laterally inner end that is pivotally connected to the carrier 14 by a hinge mount 70 similar to the mount 66. The mount 70 is aligned with the mount 66 so that the main boom 64 and brace 68 pivot about a common hinge axis X. The brace 68 extends diagonally, laterally outwardly and rearwardly, from the carrier 14 to a laterally outer portion of the main boom 64, to which it is pivotally connected. This connection is illustrated in FIG. 5. The outer end of the brace 68 carries a yoke 72 which is pivotally connected by a pivot pin 74 to a member 80 carried by the main boom 64 The member 80 has a spindle axis defined by a spindle 76 which pivots in bearings 78. This permits the boom 64 to pivot relative to the brace 68 about a horizontal axis Y substantially parallel to the longitudinal axis of the carrier 14 and the centerline of an aircraft mounted thereon.

Figure 4:
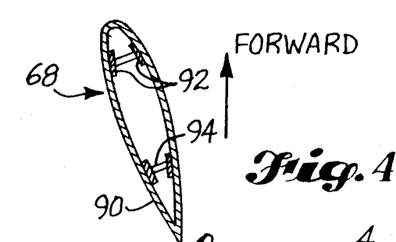
FIG. 4 is a sectional view taken along the line 4—4 in FIG. 5.

FIG. 4 is a cross-sectional view of the brace 68. As can be seen in FIG. 4, the brace cross section has an airfoil-like configuration to minimize the drag produced by the brace 68 during a taxi and take-off operation. The illustrated preferred construction of the brace 68 also minimizes its weight. The brace 68 is constructed in a manner similar to an aircraft wing with a plurality of longitudinally extending spars 92 connected by ribs 94 and enclosed within an aerodynamically shaped skin 90. The main boom 64 and outer boom 82 preferably have similar low drag lightweight configurations.

FIGS. 1–3 show a first preferred embodiment of the invention which is currently the most preferred embodiment. FIGS. 10–16 show a second preferred embodiment. The two embodiments are substantially identical except for the structure of the outer portion of the main boom 64, 64' and the outer boom 82, 132. The portions of the device shown in FIGS. 4–8 are preferably identical.

Figure 9A:
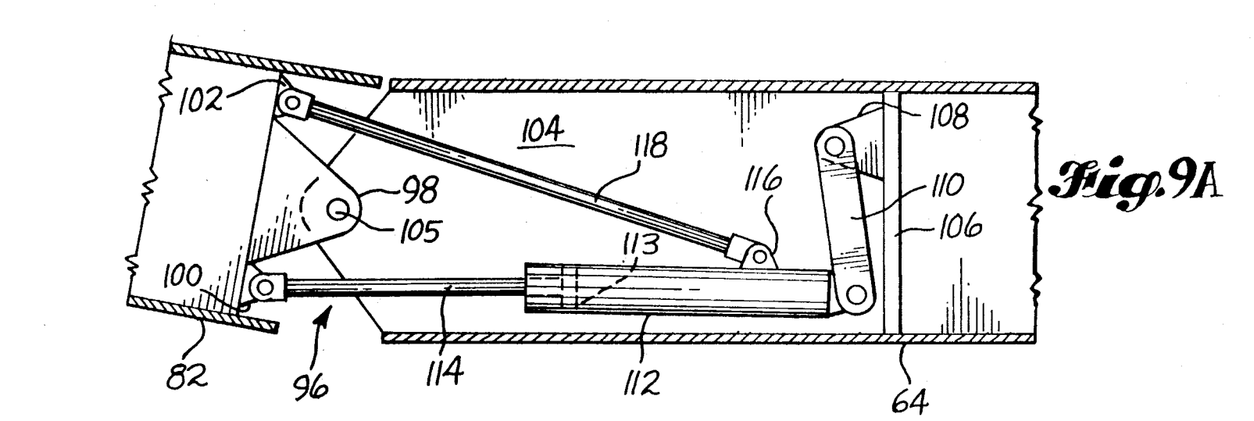
FIGS. 9A and 9B are partially schematic elevational views of the connection between the main boom and the outer boom and the mechanism for pivoting the outer boom of the device shown in FIGS. 1-3, showing the support position and the release position, respectively.
Figure 9B:
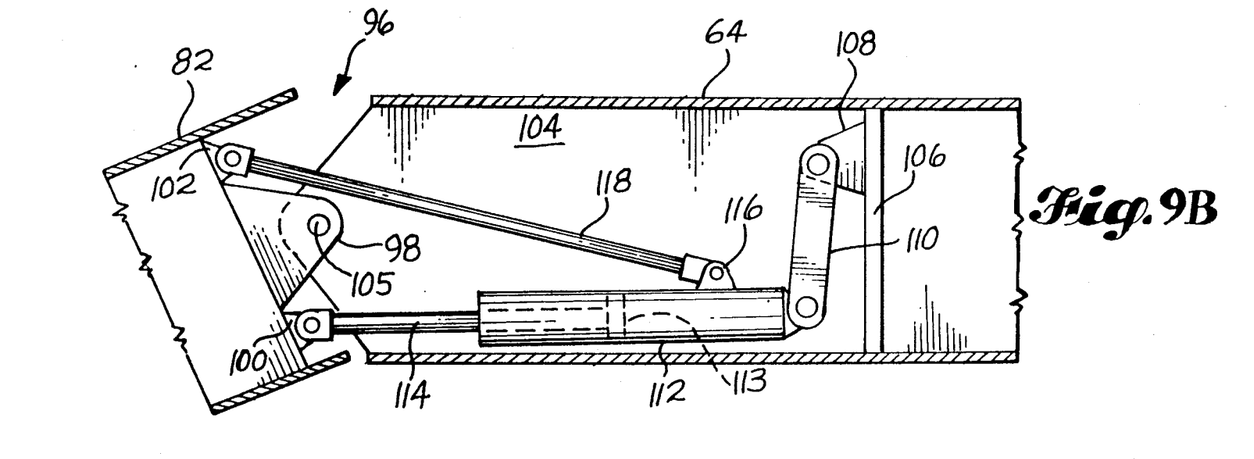

Referring to FIGS. 1–3, the preferred configuration of the outer boom 82 is a unitary boom with a cross section similar to that shown in FIG. 4. The pivotal connection 96 between the laterally outer end of the main boom 64 and the laterally inner end of the outer boom 82 is illustrated in FIGS. 9A and 9B. In FIGS. 9A and 9B, the actuating and connecting members carried by the main boom 64 are fully visible for the purpose of illustration. Most of this structure is actually mounted within the boom 64, as shown in FIGS. 1–3, to protect the structure and maintain the low drag characteristics of the connector structure of the device of the invention.

Referring to FIGS. 9A and 9B, the inner end of the outer boom 82 is provided with a main clevis 98 and two smaller clevises 100, 102 positioned below and above, respectively, the main clevis 98. The outer end portion of the main boom 64 includes a vertical mounting plate 104 which is pivotally attached to the main clevis 98 by a pin connection 105. The pin 105 defines a horizontal axis, at least substantially parallel to the carrier centerline, about which the outer boom 82 pivots relative to the main boom 64. The outer end of the boom 64 also has a second vertically oriented mounting plate 106 positioned at the laterally inner end of the plate 104 at right angles thereto. A mounting bracket 108 is secured to the plate 106 and has pivotally connected thereto one end of a link 110. The other end of the link 110 is pivotally connected to an actuating cylinder 112 in which a piston 113 reciprocates. The cylinder 112 is operated pneumatically or hydraulically to move the piston 113 and thereby pivot the outer boom 82 relative to the main boom 64. To accomplish this, the piston rod 114 is pivotally connected to the lower clevis 100 carried by the outer boom 82. A mounting yoke 116 is secured to an upper portion of the cylinder 112. A strut 118 has one end pivotally connected to the yoke 116 and its opposite end pivotally connected to the upper clevis 102 carried by the outer boom 82. Preferably, the outer boom 82 carries a second lower clevis 100 and a second upper clevis 102 positioned behind (as shown) the clevises 100, 102. These additional clevises 100, 102 are pivotally connected to actuating and connecting structure that is carried by the main boom 64 on the opposite side of the mounting plate 104 and has the same configuration as the structure shown in FIGS. 9A and 9B. The overall connection 96 provides about 30° of pivotal movement of the outer beam 82 relative to the main beam 64. The outer beam 82 pivots between an upper support position (FIGS. 1–3 and 9A) and a lower release position (FIG. 9B).

Referring to FIGS. 1 and 2, the ground-engaging portion of the outrigger assembly extends downwardly from the main boom 64 near the location of the connection between the boom 64 and the brace 68. The ground-engaging portion comprises an outrigger wheel truck 122. The truck 122 carries a plurality of ground-engaging wheels 126 which are connected to the beam 64 by structure that includes a shock absorber 124. The shock absorber 124 may take various known forms. It protects the wings 6 of an aircraft 2 mounted on the device from instantaneous vertical acceleration loads in a known manner. As can be seen in FIGS. 10, 11, 13, and 14, the outrigger assemblies of the second embodiment include similar wheel trucks 122 similarly extending downwardly from the main boom 64' at the lateral location of the connection between the boom 64' and the brace 68.

The other portion of the outrigger assembly is the wing support 84 mounted on the laterally outer end of the outer boom 82 and best seen in FIGS. 2 and 3. The support 84 includes an air cushion 86 with an upper surface that engages the undersurface of the wings 6 of the aircraft 2. The support 84 also includes a shock absorber 88 positioned below the cushion 86 to provide further protection of the wing 6 from instantaneous vertical acceleration loads. As shown in FIGS. 10, 11, 13, 14, and 16, the wing support 84 of the second embodiment has the same structure as that of the first embodiment, except that the manner in which it is connected to the rest of the device differs because of the differing structure of the outer boom.

Figure 12:
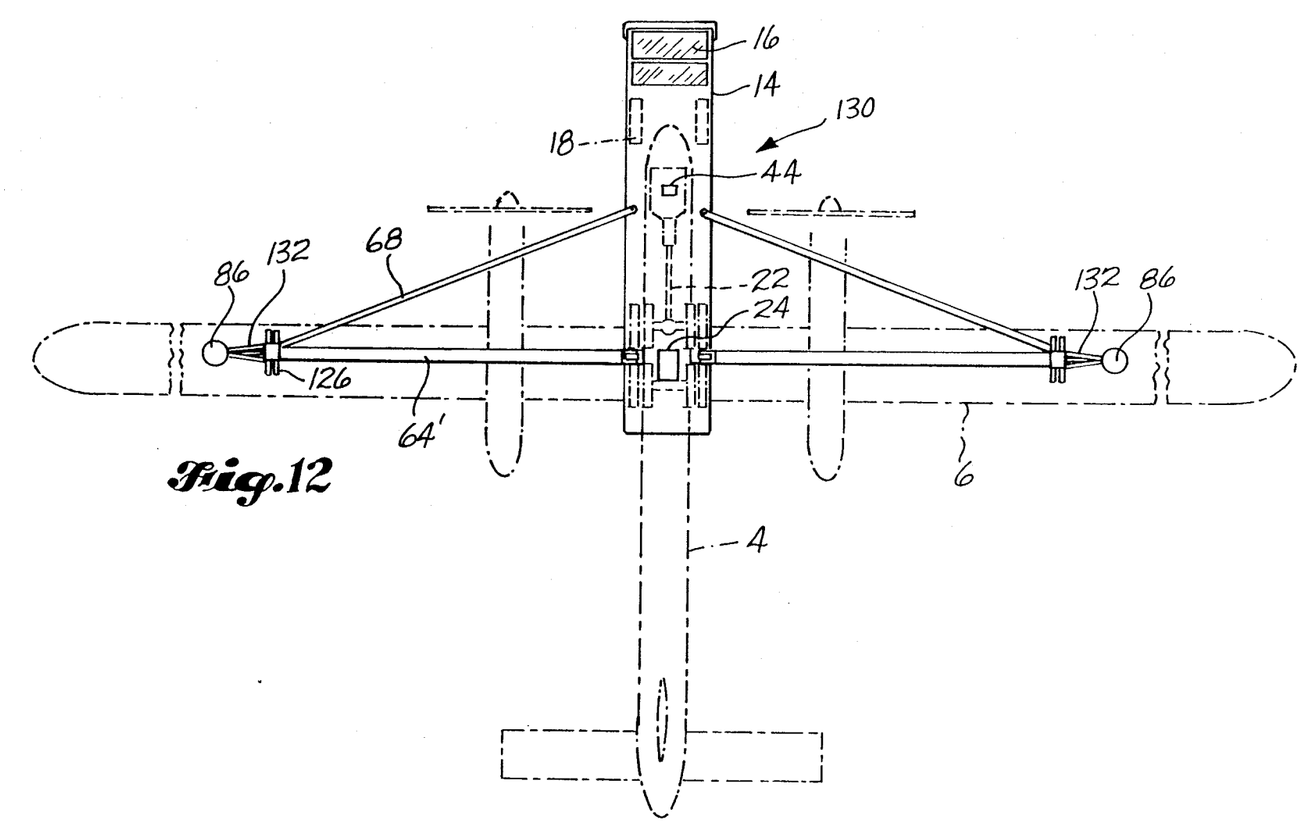
FIG. 12 is a plan view of the device shown in FIGS. 10 and 11, with the aircraft shown in phantom.
Figures 13, 14, 15, 16:
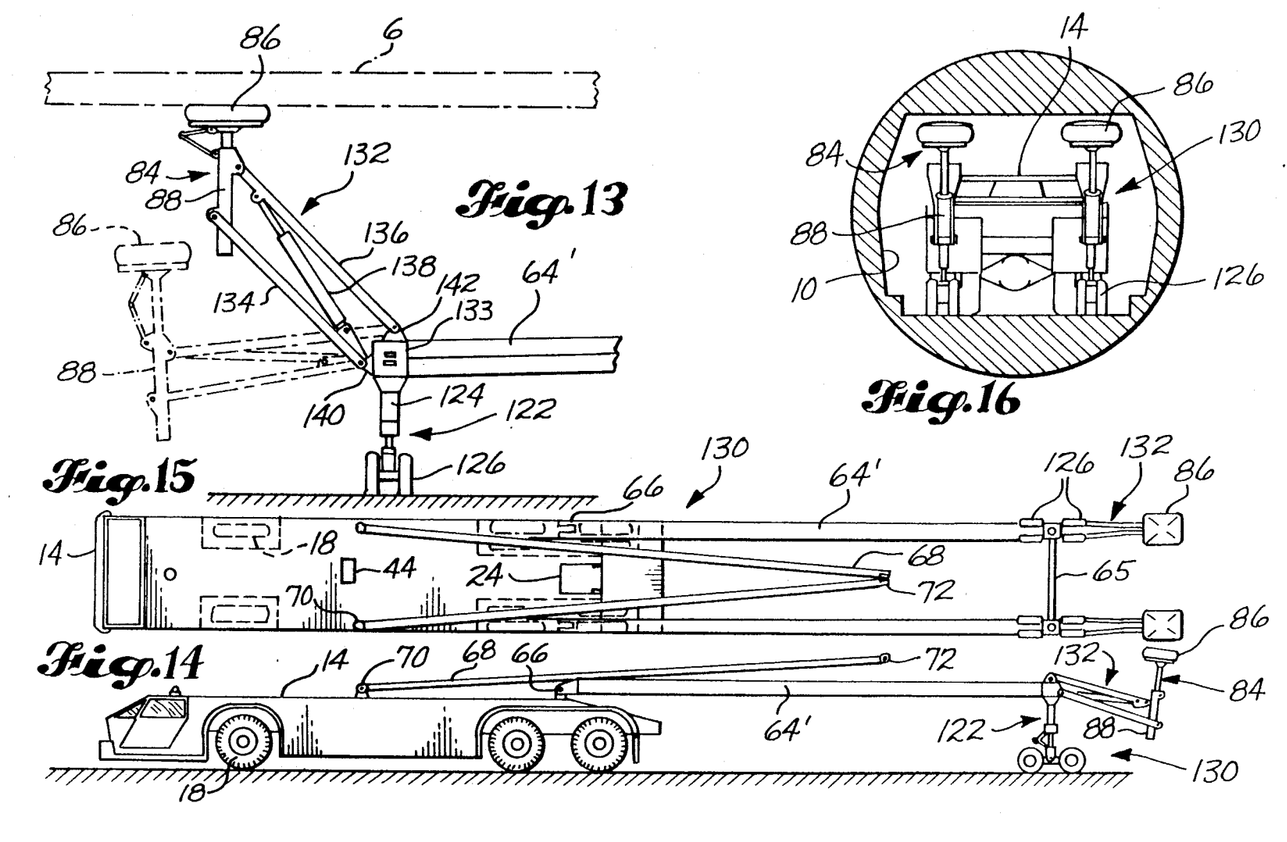
FIG. 13 is a rear elevational view of the outrigger assembly portion and surrounding structure of the device shown in FIGS. 10-12, with the lowered release position of the wing support shown in broken lines.
FIG. 14 is a side elevational view of the device shown in FIGS. 10-13 with the booms and brace in their folded positions.
FIG. 15 is a plan view of the device shown in FIG. 14.
FIG. 16 is a rear elevational view of an aircraft cargo compartment into which the folded device has been loaded, with the aircraft fuselage shown schematically in section.

Referring to FIGS. 10–16, the second preferred embodiment 130 has a main boom 64, The diagonal brace 68 is pivotally connected to, and the outrigger assembly wheel truck 122 extends downwardly from, the outer end of the boom 64'. Unlike the embodiment shown in FIGS. 1–3, the brace and truck connections are not spaced laterally inwardly from the end of the boom 64'. The structure of the end of the boom 64, is most clearly seen in FIG. 13. The outer end of the boom 64' is formed by a mounting member 133 which carries a lower mounting lug 140 and an upper mounting lug 142. The wing support 84 is pivotally connected to the mounting member 133 by two lower struts 134 and two upper struts 136, which are pivotally connected to the lower and upper mounting lugs 140, 142, respectively. The opposite ends of the struts 134, 136 are pivotally connected to the wing support 84, as shown in FIG. 13, to act like a four bar linkage. The struts 134, 136 together form the outer boom 132 of the connector structure of the second embodiment. A pneumatic or hydraulic actuator 138 has one end pivotally connected to the lug 140 and its opposite end pivotally connected to the upper struts 136. The actuator 138 is operated to pivot the wing support 84 between the upper wing-supporting position shown in solid lines in FIG. 13 and the lower release position shown in broken lines in FIG. 13.

Figure 10:
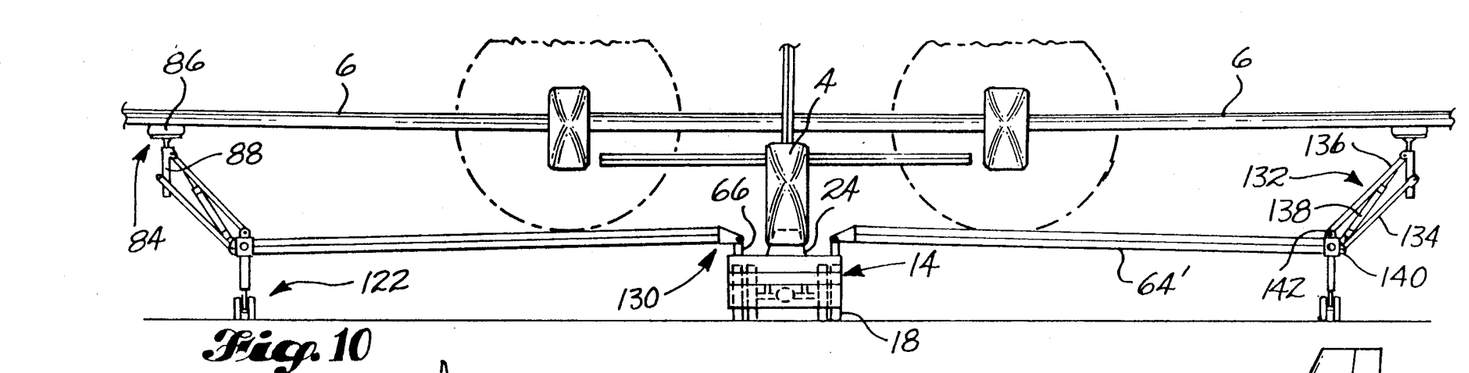
FIG. 10 is a rear elevational view of another preferred embodiment of the device of the invention with an aircraft mounted thereon.

In operation, an unfueled aircraft 2 is loaded onto the device 12, 130 by means of a suitable loading mechanism, such as one of the mechanisms shown in FIGS. 17–22. The aircraft 2 is secured in the nose down position shown in FIG. 11. The mounted position of the aircraft 2 on the device 12, 130 is also illustrated in FIGS. 1, 10, and 12. The aircraft fuselage 4 is secured to the carrier 14 by means of the fittings 24, 44 shown in FIGS. 6-8. After the fuselage 4 has been secured to the carrier 14, the wing supports 84 are pivoted upwardly until the air cushions 86 engage the undersides of the wings 6. With the aircraft 2 and its wings 6 thus fully supported, the aircraft 2 can be loaded with fuel.

Following the fueling operation, the aircraft engines are turned on, and an operator in the cab 16 of the carrier 14 drives along the runway or other take-off surface to accelerate the aircraft 2 to lift-off speed. As the device 12, 130 taxis along the runway, aircraft centerline loads are reacted to the carrier 14 through the carrier supports 24, 44 and from the carrier 14 to the runway surface through the carrier wheels 18. The centerline loads reacted by the carrier 14 include loads on the aircraft fuselage 4, such as vertical lift and other vertical loads, inertial loads, fore and aft loads, and side loads. A significant portion of the wing weight and wing fuel weight is supported on the air cushions 86 of the wing supports 84. The cushions 86 are not mechanically attached to the wings 6 and react only vertical down loads plus a small horizontal component resulting from friction between the cushions 86 and the undersurfaces of the wings 6. The loads reacted by the cushions 86 are reacted to the runway surface by the wheel truck portions 122 of the outrigger assemblies. The hinge connections 66, 70 allow relative vertical movement between the outrigger assemblies 84, 122 and the carrier 14. The triangular structure defined by the mounts 66, 70 and the boom/brace connection shown in FIG. 5 reacts some fore and aft loads.

When lift-off speed has been reached, the cylinder 50 of the nose fitting 44 is operated to retract the piston rod 53. This allows the aircraft 2 to pivot about its aft support point on pedestal 24 to move the aircraft nose upwardly into a lift-off orientation. As the aircraft nose is released, the wing supports 84 are lowered out of engagement with the undersurfaces of the wings 6 and into a release position, as illustrated in FIG. 13. Since the aircraft 2 has reached lift-off speed, the wings 6 are aerodynamically supported and, thus, do not bend when the wing supports 84 are moved away. The lifting of the nose of the aircraft 2 automatically allows the engagement member 40 carried by the fuselage 4 to move upwardly and forwardly out of the rear support pedestal 24 This completes the disengagement of the aircraft 2 from the device 12, 130 and the launching of the aircraft 2 into the air.

During flight, the fuel carried by the aircraft 2 is consumed and/or jettisoned Therefore, the aircraft 2 weighs much less upon landing than at take-off. This allows the aircraft 2 to be equipped only with relatively simple and lightweight gear for landing, such as the nose gear 7 and skid 8 shown in FIG. 19.

Following take-off of the aircraft 2, the device 12, 130 is preferably folded into a position in which it occupies a minimum amount of space for storage or transport. The folded position of the carrier 130 is illustrated in FIGS. 14-16. The folded position is achieved by removing the two pivot pins 74 that connect the outer ends of the braces 68 to the corresponding main booms 64, As described above, each of the main booms 64' is connected to the carrier 14 by a hinge mount 66 that includes a vertical spindle axis. The connection between the brace 68 and the boom 64' releasably maintains the main boom 64, in its laterally extending use position shown in FIGS. 10-13. Removal of the pin 74 leaves the boom 64' free to pivot about its vertical spindle axis at its hinge mount 66. The booms 64' are pivoted about their spindle axes 90° into the folded position shown in FIGS. 14-16 in which they extend rearwardly from the carrier 14 parallel to the carrier centerline. The booms 64' are attached together by a link 65 that is pin connected to each of the booms 64' to allow relative pivotal motion between the booms 64' and the link 65. The braces 68 are also pivoted about the vertical spindle axes defined at their hinge mounts 70 into a folded position on top of the carrier 14, best seen in FIG. 15. When the booms 64' are pivoted into their folded position, the wheel axles of the outrigger wheel trucks 122 are unlocked and rotated 90°. The axles are locked in their new orientation so that the carrier 14 will tow the booms 64' like a conventional trailer, except that the booms 64' move as a parallelogram when towed around a turn.

When the device 130 has been secured in the folded position shown in FIGS. 14-16, it may be driven to a storage area or aboard a transport aircraft. FIG. 16 illustrates the device 130 inside a cargo compartment 10 of a transport aircraft. The outer boom 132 and the wing support 84 carried thereby have been lowered into their release position to minimize the vertical height of the device 130. The device 130 may be transported, for example, to another location for launching additional air vehicles or a landing location of the aircraft 2 for recovering the aircraft 2.

The device of the invention is preferably provided with a loading mechanism for loading an aircraft onto the device for the taxi and take-off procedure, or for retrieval of the aircraft upon landing of the aircraft. A preferred form of the loading mechanism 150 is illustrated in FIGS. 17-20. The loader 150 is preferably removably attachable to the carrier 14 of the device 12, 130 so that it can be removed prior to the taxi and take-off procedure. This avoids adding the weight of the loader 150 to the device 12, 130 during the taxi and take-off procedure.

Figure 17:
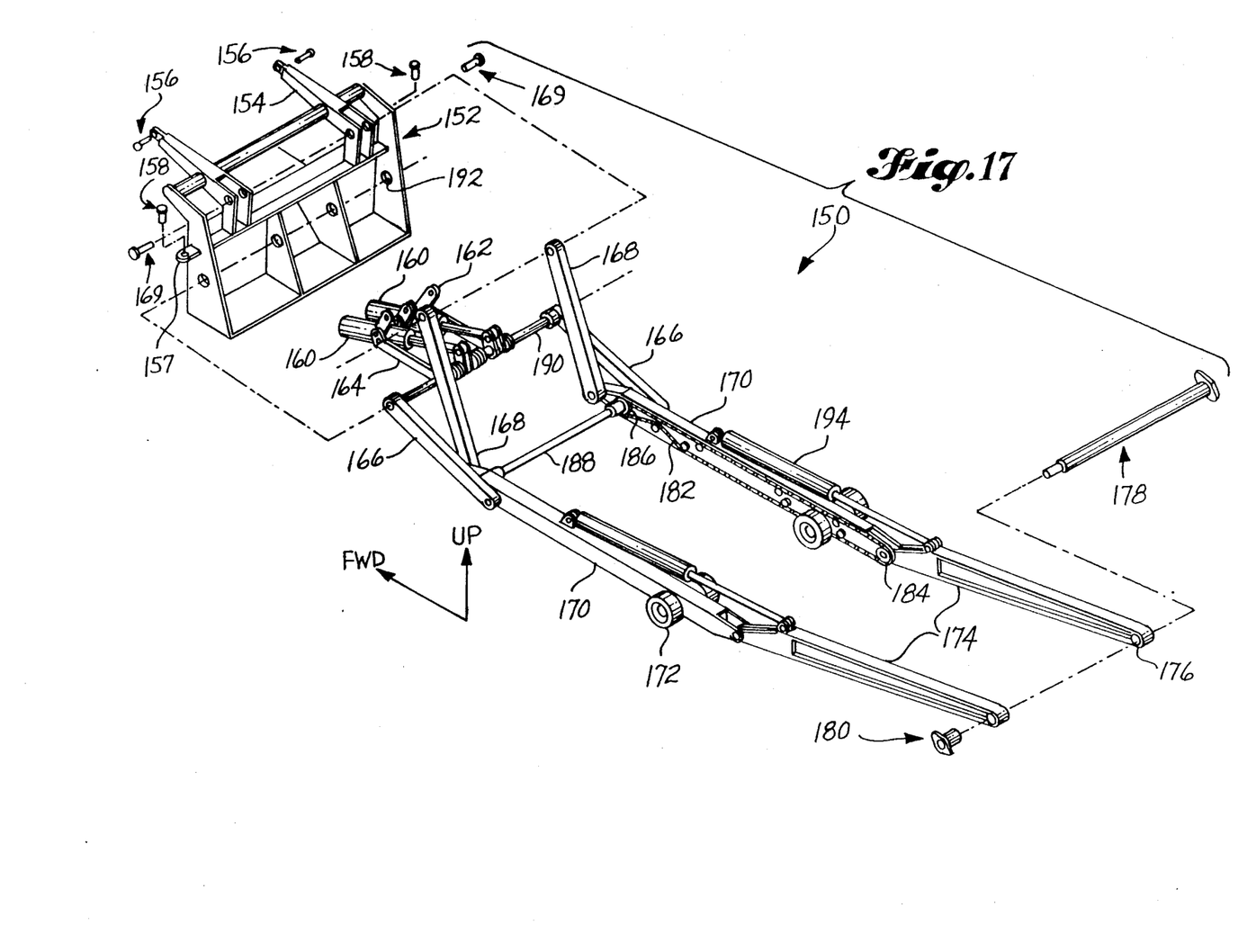
FIGS. 17 is an exploded pictorial view of a self-loading mechanism for use with the devices shown in FIGS. 1-16.
Figure 18:
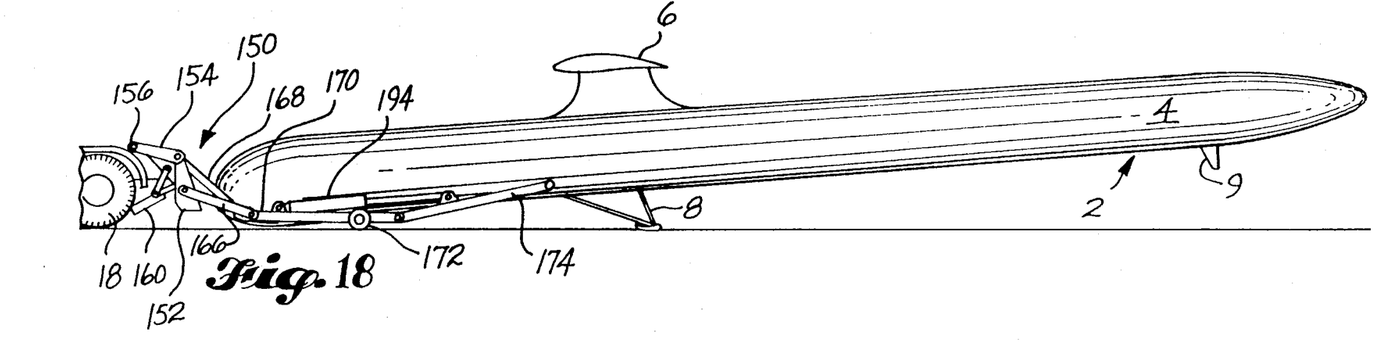
FIGS. 18-20 are sequential side elevational views of an aircraft being loaded onto the device of the invention by means of the mechanism shown in FIG. 17.

Referring to FIG. 17, the loader 150 includes an attachment frame 152 having attachment arms 154 and lugs 157 that are rigidly attachable to the body of the carrier 14 by pins 156, 158. The loading mechanism 150 also includes a pair of actuators 160 that engage a torque tube 190. The torque tube 190 extends through holes 192 in the frame 152. The engagement of the tube 190 in the holes 192 maintains the tube 190 in a fixed position relative to the frame 152 while allowing it to pivot relative to the frame 152. The actuators 160 are secured to the frame 152 by pivotable reaction links 162, which react forces in much the same manner as the link 110 shown in FIGS. 9A and 9B. Struts 164 are pivotally connected to the actuators 160 and the tube 190 and function in the same manner as the strut 118 shown in FIGS. 9A and 9B.

The opposite ends of the tube 190 are rigidly connected to driven links 166. The driving of the two links 166 with a common tube 190 maintains synchronization of the movement of the links 166. The end of each link 166 opposite the tube 190 is pivotally attached to a forward end portion of a stage one beam 170 by a pin joint. The outer or rear ends of two control links 168 are also pivotally attached to the forward end portions of the stage one beams 170 by pin joints. The inner ends of the control links 168 are pivotally attached to rear portions of the frame attachment arms 154 by pins 169. Each stage one beam 170 carries a pair of wheels 172 which provide rolling ground reaction points. The rear end of each stage one beam 170 is pin connected to the forward end of a stage two arm 174. A second stage actuator 194 is mounted on each of the stage one beams 170 and engages the corresponding stage two arm 174 to pivot the arm 174 relative to the beam 170. The rear ends of the stage two arms 174 have openings 176 formed therein for receiving a loading bar 178.

During the operation of the loader 150, it is necessary for the right and left hand portions of the loader 150 to be synchronized. The stage one actuators 160 are synchronized by their engagement of a common torque tube 190, as discussed above. The stage two actuators 194 are synchronized by a roller chain and sprocket arrangement. A roller chain 182 is carried by each of the stage one beams 170. The chain 182 is driven by a sprocket 184 located at the pivot connection between the stage one beam 170 and the stage two arm 174. The sprocket 184 drives a second sprocket 186 which transfers loads through a torque tube 188 to the chain and sprocket system on the opposite stage one beam 170.

In use, the loader 150 is attached to the rear end of the carrier 14 by backing the carrier 14 up to the loader 150 and securing the loader 150 to the carrier 14 by means of pins 156. The loading of the aircraft 2 onto the carrier 14 by means of the loader 150 is commenced by maneuvering the carrier 14 to align it with the aircraft 2, with the rear of the carrier 14 facing the nose of the aircraft 2. The first and second stages of the loader 150 are deployed into their extend pick-up position illustrated in FIGS. 7 and 18. The carrier 14 is backed up to move the loader 150 into a position in which it straddles the aircraft 2. When the loader 150 has been correctly positioned, the loading bar 178 is inserted through the openings 176 in the rear ends of the stage two arms 174 and through the bearing fittings on the forward wheel well bulkheads on the sides of the aircraft fuselage 4, which have been positioned between the ends of the arms 174. The loading bar 178 is secured with a lock nut 180. The use of a loading bar 178 that extends from side to side through structure carried by the aircraft 2 avoids torsion loads in the loader arms 174 due to eccentric loading at the pick-up openings 176 on the arms 174.

Figure 19:
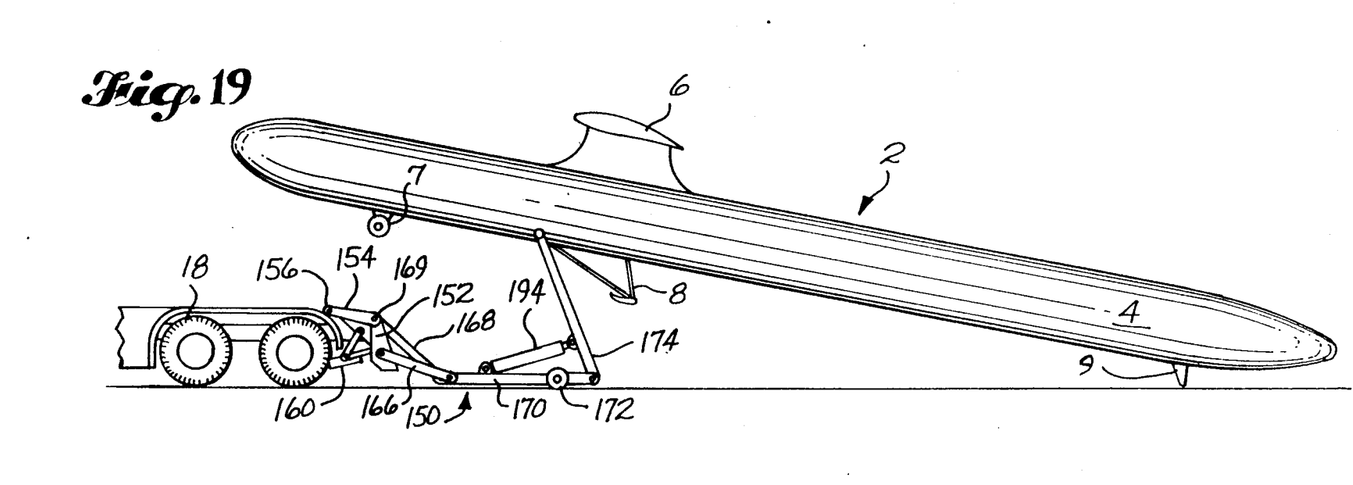
Figure 20:
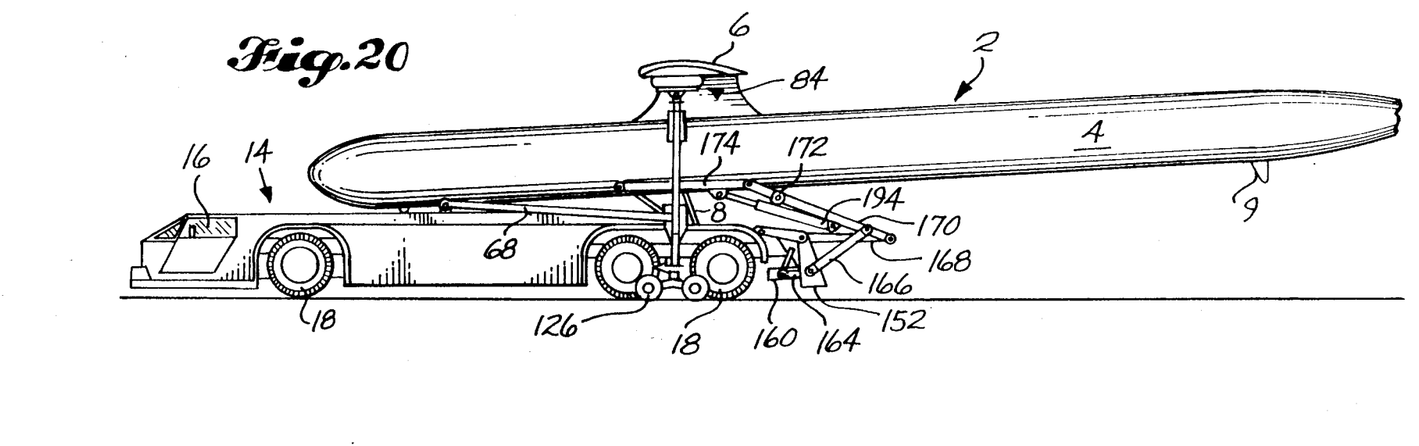

Once the aircraft 2 has been secured to the loader 150, the stage two actuators 194 are operated to pivot the stage two arms 174 and raise the air vehicle 2 high enough so that the landing gear can be retracted. The raising of the aircraft nose is illustrated in FIG. 19 just prior to the retracting of the nose gear 7. The aft portion of the aircraft 2 rests on a loading bumper 9. During the process of raising the nose of the aircraft 2, loads are reacted to the ground through the stage one wheels 172.

The aircraft nose is raised until the stage two actuators 194 bottom out. When this occurs, the stage one actuators 160 are activated to raise the stage one beams 170. The movement of the beams 170 moves the aircraft 2 vertically and forwardly relative to the carrier 14. As the engagement member 40 carried by the aircraft 2 approaches the main support pedestal 24 on the carrier 14, the stage two actuators 194 are again operated in conjunction with the stage one actuators 160. The two sets of actuators 160, 194 are operated to precisely position the engagement member 40 relative to the pedestal 24 and finally move the member 40 downwardly and rearwardly into latching engagement with the pedestal 24. Once the main support pedestal 24 has been engaged, the two sets of actuators 160, 194 are operated to move the nose of the aircraft 2 down to engage the front latch fitting 44. When the projection 56 carried by the aircraft 2 has moved into the opening 48 formed by the fitting 44 and the piston rod 53 has been moved to secure the projection 56 in place, the loading of the aircraft 2 onto the carrier 14 is completed. The wing supports 84 are raised into a position in which they support the wings 6 of the aircraft 2. The aircraft 2 can then be relaunched using the taxi and take-off procedure described above or may be taken to another location at the air field. If it desired to remove the aircraft 2 from the device 12, 130 without launching the aircraft 2 into the air, it can be unloaded by use of the loader 150 or other ground equipment. In the former case, the loading sequence described above is reversed. When not in use, the loader 150 may be stowed on the carrier 14 in a folded position similar to the position shown in FIG. 20 except that the loader arms 174 rest on the carrier 14.

The use of the loader 150 with the device of the invention provides a self-contained system for handling the aircraft 2. The power to operate the loader 150 is preferably provided by the carrier 14. This eliminates any need for additional power sources for operating the loader 150. In addition, the use of the carrier 14 with its own engine can eliminate most ground carts that would otherwise be required. The engine 20 of the carrier 14 can be used to provide ground electrical power, pneumatic power, and hydraulic power to the aircraft 2 and the loader 150. All test and related equipment for the aircraft 2 can be placed on the carrier 14. In addition, the carrier 14 may include fire suppression equipment.

Figure 21:
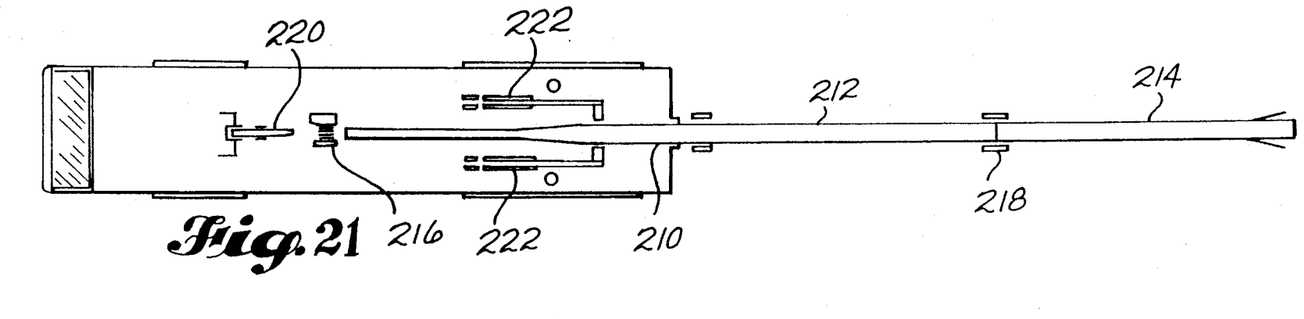
FIG. 21 is a top plan view of the device of the invention equipped with a rail loading mechanism, with other parts of the device omitted to simplify the illustration of the loading mechanism.
Figure 22:
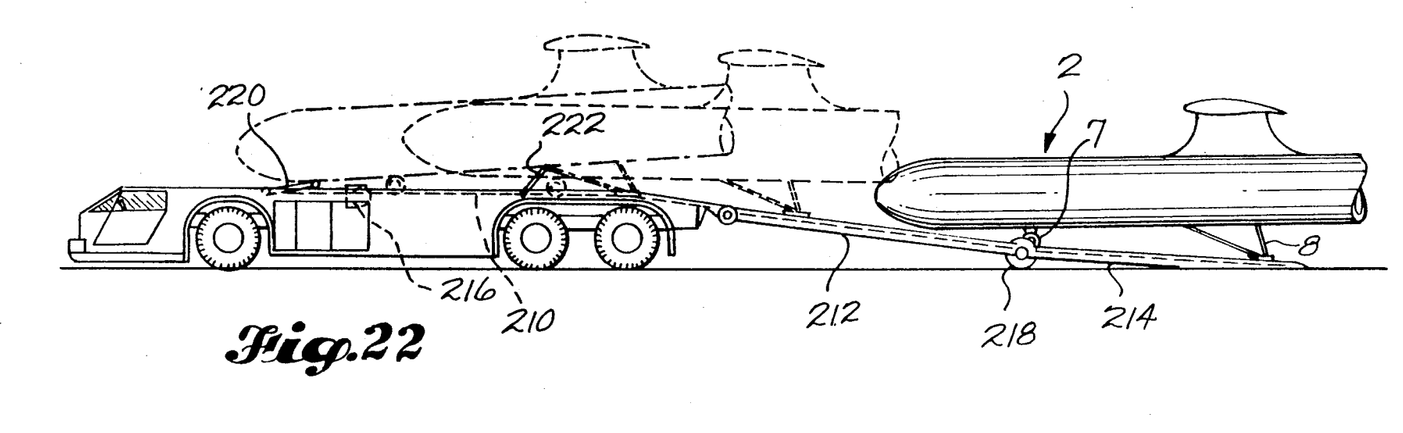
FIG. 22 is a side elevational view illustrating the loading of an aircraft onto the device by means of the mechanism shown in FIG. 21.

Another form of loading equipment for loading an air vehicle onto the carrier 14 is illustrated in FIGS. 21 and 22. This alternative form of a loading mechanism has the advantage of being relatively simple. However, the mechanism shown in FIGS. 17–20 is generally preferred because it constrains the air vehicle The constraint of the air vehicle protects it against damage from, for example, wind gusts that occur during the loading procedure, without the need for auxiliary equipment or additional personnel to restrain the air vehicle.

The loading mechanism shown in FIGS. 21 and 22 is a rail loader. A fixed section 210 of rail is permanently mounted on the carrier 14 along the carrier centerline. Two detachable rail ramp sections 212, 214 are combined to complete a path from the ground onto the top of the carrier 14. The completed pathway is provided with wheels 218 at the junction of the rail ramp sections 212, 214. The ramp section lengths and the resulting ramp angles are chosen to provide sufficient clearance for an air vehicle.

In operation, the carrier 14 is positioned forward of and aligned with an air vehicle 2 to be loaded thereon. With the removable ramps 212, 214 secured in place, the line of a winch 216 is attached to the nose gear 7 of the aircraft 2. The winch 216 is mounted on the top of the carrier 14. It is operated to tow the aircraft 2 up the ramp sections 212, 214 and along the fixed rail section 210 to position the aircraft 2 relative to the support fittings 24, 44. The fittings 24, 44 are pivotable upwardly by forward and aft linear actuators 220, 222. The supports 24, 44 are secured to the aircraft 2 and then are raised an amount sufficient to raise the aircraft 2 high enough so that the landing gear can be retracted. Once tho gear has been retracted, the supports 24, 44 are lowered to the taxi/take-off position and looked in place. The wing supports 84 are then raised to support the aircraft wings 6.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A device for supporting, for taxi and take-off, an air vehicle having a fuselage and a pair of wings extending laterally outwardly from the fuselage, said device comprising:

a center carrier having at least one support for the fuselage and a member that engages a take-off surface and reacts centerline vertical loads to said surface;

a pair of outrigger assemblies spaced laterally from said carrier on opposite sides of said carrier; each said assembly including a wing support and a portion that engages said take-off surface to independently react wing weight vertical loads to said surface; and a pair of connector structures connecting said assemblies, respectively, to said carrier; said connector structures allowing vertical movement of said outrigger assemblies relative to said carrier, wherein each connector structure includes a main boom, having a laterally inner end connected to said carrier and a laterally outer end and an outer boom pivotally attached to said outer end, to pivot about a horizontal axis between a support position and a release position, wherein said engaging portion of said outrigger assembly extends downwardly from said main boom, and said wing support is carried by said outer boom.

2. The device of claim 1, in which each connector structure further includes a main boom extending laterally from said carrier, and a brace extending diagonally from a laterally outer portion of said boom to said carrier.

3. The device of claim 1, in which said inner end of said main boom is pivotally attached to said carrier to pivot about a horizontal axis.

4. The device of claim 3, in which said main boom extends laterally from said carrier, and said structure further comprises a brace extending diagonally from a laterally outer portion of said main boom to said carrier.

5. The device of claim 1, in which said main boom extends laterally from said carrier, and each connector structure further comprises a brace extending diagonally from a laterally outer portion of said main boom to said carrier.

6. The device of claim 1, in which said outer boom includes an external skin aerodynamically shaped to minimize drag.

7. The device of claim 1, in which said main boom includes an external skin aerodynamically shaped to minimize drag, 8. The device of claim 1, in which said outer boom comprises a four bar linkage.

9. The device of claim 1, in which said portion of each said assembly includes a shock absorber depending downwardly from said structure.

10. The device of claim 9, in which said main boom is pivotally connected to said carrier to pivot about a horizontal axis.

11. The device of claim 1, in which each said wing support includes a shock absorber.

12. The device of claim 1, in which said portion of each said assembly includes a first shock absorber depending downwardly from said main boom; and each said wing support includes a support surface positioned to engage an undersurface of one of said wings, and a second shock absorber positioned below said support surface.

13. The device of claim 12, in which said main boom is pivotally connected to said carrier to pivot about a horizontal axis.

14. The device of claim 1, in which, in each said assembly, said wing support has a support position in which it is spaced laterally outwardly from said portion that engages said take-off surface.

15. The device of claim 1, in which, in each said assembly, said wing support is spaced laterally outwardly from said portion that engages when said wing support is in said support position.

16. The device of claim 15, in which said main boom extends laterally from said carrier, and said structure further comprises a brace extending diagonally from a laterally outer portion of said main boom to said carrier.

17. The device of claim 15, in which each said main boom is pivotally attached to said carrier to pivot about a horizontal axis.

18. The device of claim 14, in which said portion of each said assembly includes a shock absorber depending downwardly from said structure.

19. A device for supporting, for taxi and take-off, an air vehicle having a fuselage and a pair of wings extending laterally outwardly from the fuselage, said device comprising:

a center carrier having at least one support for the fuselage and a member that engages a take-off surface and reacts centerline vertical loads to said surface;

a pair of outrigger assemblies spaced laterally from said carrier on opposite sides of said carrier; each said assembly including a wing support and a portion that engages said take-off surface to independently react wing weight vertical loads to said surface; and a pair of connector structures connecting said assemblies, respectively, to said carrier; said structures allowing vertical movement of said assemblies relative to said carrier, wherein each connector structure is pivotally attached to said carrier to pivot about a horizontal axis.

20. The device of claim 19, in which each connector structure is pivotable between a use position in which it extends generally laterally from said carrier and a folded position, and said structure is releasably securable in said use position.

21. The device of claim 19, in which each connector structure includes a main boom extending laterally from said carrier and a brace extending diagonally from a laterally outer portion of said boom to said carrier; said boom and said brace each being pivotally attached to said carrier to pivot about a common horizontal axis.

22. The device of claim 21, in which said main boom is pivotable about a vertical axis between a use position in which it extends laterally from said carrier and a folded position, and said main boom is releasably securable in said use position.

23. The device of claim 19, in which said engagement portion of each said assembly includes a shock absorber depending downwardly from said structure.

24. A device for supporting, for taxi and take-off, an air vehicle having fuselage and a pair of wings extending laterally outwardly from the fuselage, said device comprising:

a center carrier having at least one support for the fuselage, and a member that engages a take-off surface and reacts centerline vertical loads to said surface;

a pair of outrigger assemblies spaced laterally from said carrier on opposite sides of said carrier; each said assembly including a wing support and a portion that engages said take-off surface to independently react wing weight vertical loads to said surface; wherein, in each said assembly, said wing support has a support position in which it is spaced laterally outwardly from said portion that engages said take-off surface; and a pair of connector structures connecting said assemblies, respectively, to said carrier; said connector structures allowing vertical movement of said assemblies relative to said carrier, wherein each connector structure is pivotally attached to said carrier to pivot about a horizontal axis.

25. The device of claim 24, in which each said wing support includes a shock absorber.

26. A loader for loading an air vehicle having a fuselage onto a launching device having a top portion with at least one support for the fuselage, said loader comprising:

a pair of first stage beams; each said beam having a forward end, and an aft end;

a pair of second stage arms, one corresponding to each of said beams; each said arm having a forward end pivotally connected to said aft end of the corresponding beam, and an aft end attachable to the fuselage;

said beams and said arms being positioned to straddle a lower portion of the fuselage;

a linking structure attached to said beams and attachable to said device;

a first stage actuator that engages said linking structure to move said forward ends of said beams vertically, and forwardly and aftly; and a second stage actuator for pivoting said arms relative to said beams;

said first and second stage actuators being operable together to precisely position the fuselage relative to said support and bring the fuselage into engagement with said support.

* * * * *